United States Patent

Suzuki

(10) Patent No.: US 7,032,580 B2
(45) Date of Patent: Apr. 25, 2006

(54) INTERNAL COMBUSTION ENGINE SYSTEM AND METHOD FOR CONTROLLING THE SAME

(75) Inventor: Naoto Suzuki, Fujinomiya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 11/111,765

(22) Filed: Apr. 22, 2005

(65) Prior Publication Data

US 2005/0235969 A1    Oct. 27, 2005

(30) Foreign Application Priority Data

Apr. 23, 2004    (JP)    ............... 2004-128610

(51) Int. Cl.
*F02M 33/04*    (2006.01)

(52) U.S. Cl. .................. 123/568.21; 123/520; 123/698

(58) Field of Classification Search ................ 123/516, 123/518, 519, 520, 698, 568.21
See application file for complete search history.

(56) References Cited

U.S. PATENT DOCUMENTS

| | | | | |
|---|---|---|---|---|
| 4,450,825 A | * | 5/1984 | Sekiguchi et al. | 123/698 |
| 5,619,973 A | * | 4/1997 | Hara et al. | 123/520 |
| 6,116,221 A | * | 9/2000 | Matsumoto et al. | 123/520 |
| 6,247,457 B1 | * | 6/2001 | Mallebrein | 123/520 |
| 6,438,945 B1 | * | 8/2002 | Takagi et al. | 60/283 |
| 6,694,956 B1 | * | 2/2004 | Kawaguchi et al. | 123/568.21 |
| 2005/0155587 A1 | * | 7/2005 | Suzuki | 123/520 |

FOREIGN PATENT DOCUMENTS

| | | |
|---|---|---|
| JP | 06-033838 | 2/1994 |
| JP | 09-310643 | 12/1997 |
| JP | 10-115258 | 5/1998 |
| JP | 2003-035231 | 2/2003 |

* cited by examiner

*Primary Examiner*—Thomas Moulis
(74) *Attorney, Agent, or Firm*—Kenyon & Kenyon LLP

(57) ABSTRACT

When fuel vapor flows to an intake passage from a canister, the amount of fuel injected to an internal combustion engine is corrected to suppress fluctuation of the air-fuel ratio in the engine due to the fuel vapor. An EGR mechanism variably sets the EGR rate. When the pressure in a fuel tank is greater than or equal to a predetermined value, a tank sealing system releases gas containing fuel vapor from the fuel tank to the canister on condition that fuel vapor is flowing to the intake passage from the canister. A controller controls the EGR mechanism to reduce the EGR rate when gas is released from the fuel tank to the canister. Therefore, combustion is stabilized even if EGR is executed when gas in the fuel tank is released.

8 Claims, 5 Drawing Sheets

Purge Control

Pressure in Fuel Tank

Opening Degree of EGR Valve

Pressure Control Valve

Fluctuation of Air-Fuel Ratio

Combustion Condition

INTERNAL COMBUSTION ENGINE SYSTEM AND METHOD FOR CONTROLLING THE SAME

BACKGROUND OF THE INVENTION

The present invention relates to an internal combustion engine system and a method for controlling the system.

A typical vehicle such as an automobile is provided with a fuel vapor processing unit, which traps fuel vapor produced in a fuel tank or the like with a canister and supplies the fuel vapor to an intake system with air using the intake air pressure (negative pressure) of the internal combustion engine so that the fuel vapor is burned in a combustion chamber. In such a fuel vapor processing unit, since most of the fuel vapor produced in the fuel tank is trapped by the canister, a large amount of the trapped fuel vapor must be supplied to the intake system of the internal combustion engine to prevent the canister from being saturated with the fuel vapor. The fuel injection amount in the internal combustion engine is corrected based on the flow rate (purge flow rate) of gas (purge gas) supplied to the intake system from the canister and the concentration (vapor concentration) of fuel included in the gas to suppress fluctuation of the air-fuel ratio in the internal combustion engine when the fuel vapor is supplied to the intake system of the internal combustion engine.

On the other hand, an exhaust gas recirculation (EGR) for returning part of exhaust gas to the intake system is performed in the internal combustion engine to improve the exhaust emission and the fuel consumption. However, to perform the EGR means to burn air-fuel mixture with the existence of gas that does not contribute to combustion in the combustion chamber. Therefore, if the ratio of exhaust gas (EGR rate) in the combustion chamber is excessively high during combustion, the combustion becomes unstable. Thus, the EGR rate of the internal combustion engine is controlled to be maximized within a range that does not excessively deteriorate the combustion based on the operating condition of the engine such as the engine speed and the engine load.

When supplying the fuel vapor in the canister to the intake system of the internal combustion engine with air while executing the EGR, the intake pressure in the internal combustion engine might approach the atmospheric pressure according to the execution of the EGR, which might decrease the purge flow rate. Therefore, Japanese Laid-Open Patent Publication No. 10-115258 discloses a technique for controlling the EGR rate such that execution of the EGR does not become an external disturbance to the purge flow rate so that the purge flow rate is maintained. The EGR rate in this case is also preferably maximized within a range such that the EGR rate does not become an external disturbance to the purge flow rate from the aspect of improving the exhaust emission and the fuel consumption.

A tank sealing system has been employed these days to suppress release of fuel vapor from the fuel tank. The tank sealing system is designed such that the fuel tank is hermetically closed in a normal state and releases gas in the tank to the canister when the pressure in the fuel tank is increased. In such a tank sealing system, the gas in the fuel tank is released to the canister when the engine is running and the fuel vapor in the canister is supplied to the intake system, that is, when the fuel vapor is purged. Accordingly, when the gas in the fuel tank is released to the canister, the fuel vapor contained in the gas is supplied to the intake system from the canister. This prevents the canister from being saturated with fuel vapor.

However, if the pressure in the fuel tank is increased and the gas in the tank is released to the canister when supplying the fuel vapor trapped in the canister to the intake system with air, that is, when the fuel vapor is purged, the gas flows into the intake system and causes the air-fuel ratio in the internal combustion engine to fluctuate. The reason for this is that, first of all, the concentration of the fuel vapor contained in the gas in the fuel tank is unclear. In addition, when the gas abruptly flows into the canister and the intake system as the gas is released from the fuel tank, the fluctuation of the air-fuel ratio caused by the introduction of gas cannot be sufficiently suppressed by correcting the fuel injection amount based on the purge flow rate as described above. When the air-fuel ratio fluctuates, the tendency of the combustion being unstable by the EGR becomes significant. Therefore, if the EGR rate is controlled to be maximized as described above when releasing gas from the fuel tank, the combustion becomes unstable due to the fluctuation of the air-fuel ratio caused by the release of gas from the fuel tank. Accordingly, deterioration of the driving performance might become unignorable.

SUMMARY OF THE INVENTION

Accordingly, it is an object of the present invention to provide an internal combustion engine system and a method for controlling the system that stabilizes combustion even if an EGR is executed when gas in a fuel tank is released.

To achieve the above-mentioned objective, the present invention provides an internal combustion engine system. The engine system includes an internal combustion engine, which has a combustion chamber and an intake passage connected to the combustion chamber. A fuel tank stores fuel. A canister stores fuel vapor generated in the fuel tank. When the engine is running, fuel vapor is permitted to flow to the intake passage from the canister. When fuel vapor flows to the intake passage, the amount of fuel injected to the engine is corrected to suppress fluctuation of the air-fuel ratio in the engine due to the fuel vapor. An EGR mechanism introduces part of exhaust gas exhausted from the engine to the intake passage. The EGR mechanism variably sets the EGR rate, which is the ratio of exhaust gas contained in gas introduced to the combustion chamber. A tank sealing system seals the fuel tank. When the pressure in the fuel tank is greater than or equal to a predetermined value, the sealing system releases gas containing fuel vapor from the fuel tank to the canister on condition that fuel vapor is flowing to the intake passage from the canister. A controller controls the EGR mechanism to reduce the EGR rate when gas is released from the fuel tank to the canister.

Further, the present invention provides a method for controlling an internal combustion engine system equipped with an internal combustion engine and an EGR mechanism. The EGR mechanism introduces part of exhaust gas exhausted from the engine to an intake passage. The method includes storing fuel vapor generated in a fuel tank in a canister. Fuel vapor is permitted to flow to the intake passage from the canister when the engine is running. The amount of fuel injected to the engine is corrected to suppress fluctuation of the air-fuel ratio in the engine due to fuel vapor when fuel vapor flows to the intake passage. The fuel tank is sealed when the pressure in the fuel tank is less than a predetermined value. When the pressure in the fuel tank is greater than or equal to the predetermined value, gas containing fuel vapor is released from the fuel tank to the canister on condition that fuel vapor is flowing to the intake passage from the canister. The EGR mechanism is controlled to decrease the EGR rate, which is the ratio of exhaust gas contained in gas introduced to the combustion chamber, when gas is released from the fuel tank to the canister.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
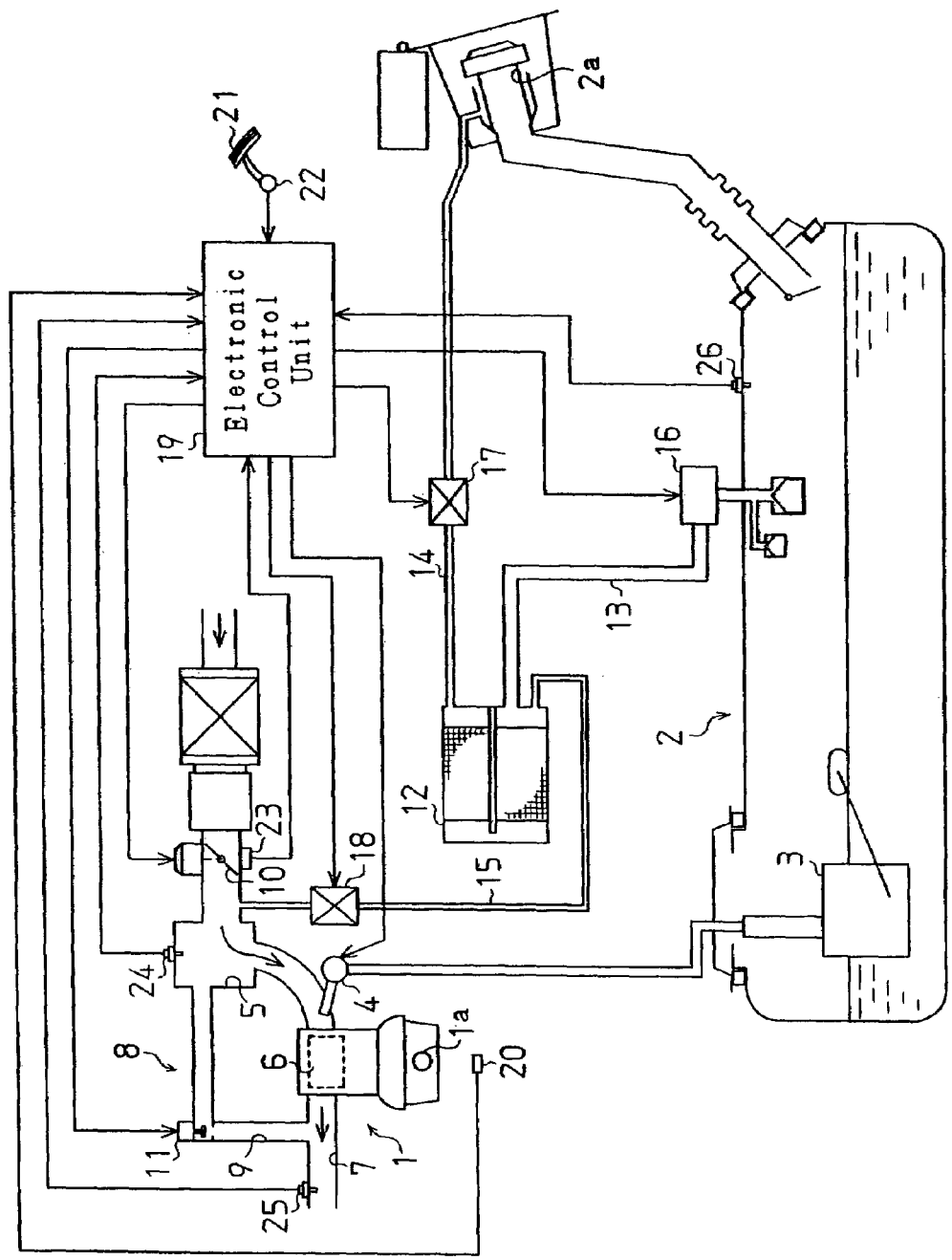
FIG. 1 is a schematic view illustrating a fuel supplying system and a fuel vapor processing unit of an internal combustion engine system according to one embodiment of the present invention is applied.

An internal combustion engine system according to an embodiment of the present invention will now be described with reference to FIGS. 1 to 7. The internal combustion engine system is equipped with a gasoline engine 1 for an automobile. According to an internal combustion engine, which is the engine 1 in this embodiment, shown in FIG. 1, fuel in a fuel tank 2 is supplied to a fuel injection valve 4 by a fuel pump 3. The fuel injected from the fuel injection valve 4 and air drawn in through an intake passage 5 are supplied to a combustion chamber 6. Exhaust gas produced after combustion of an air-fuel mixture in the combustion chamber 6 is exhausted to an exhaust passage 7. Part of the exhaust gas is supplied to the intake passage 5 as EGR gas by an EGR mechanism 8. The EGR mechanism 8 includes an EGR passage 9, which introduces part of exhaust gas in the exhaust passage 7 to the intake passage 5, and an EGR valve 11. The opening degree of the EGR valve 11 is adjusted to control the flow rate of exhaust gas (EGR gas) that passes through the EGR passage 9.

The automobile equipped with the engine 1 includes a fuel vapor processing unit for processing fuel vapor produced in the fuel tank 2 or the like. The fuel vapor processing unit includes a canister 12, a vapor passage 13, an atmospheric passage 14, and a purge passage 15. The canister 12 is provided with an absorbent such as activated carbon for absorbing fuel vapor. The vapor passage 13 introduces fuel vapor produced in the fuel tank 2 to the canister 12. The atmospheric passage 14 introduces air to the canister 12. The purge passage 15 transmits the fuel vapor in the canister 12 and the air to a section of the intake passage 5 downstream of a throttle valve 10. A pressure control valve 16 is located between the vapor passage 13 and the fuel tank 2. The pressure control valve 16 is selectively opened and closed to selectively connect and disconnect the vapor passage 13 to and from the fuel tank 2. An atmospheric shutter valve 17 is located in the atmospheric passage 14. The atmospheric shutter valve 17 is operated to selectively open and close the atmospheric passage 14. A purge control valve 18 is located in the purge passage 15. The opening degree of the purge control valve 18 is controlled to adjust the flow rate of gas (purge gas) supplied to the intake passage 5 from the canister 12.

The pressure control valve 16 is electronically controlled based on the pressure or the like in the fuel tank 2 in the normal state. When the fluid level in the fuel tank 2 is increased, such as when the automobile is being fueled, the pressure control valve 16 is forcibly and mechanically opened. When the pressure control valve 16 is opened, the fuel vapor produced in the fuel tank 2 flows into the vapor passage 13 and is temporarily absorbed by the absorbent in the canister 12. When the atmospheric shutter valve 17 is opened and the purge control valve 18 is opened, the fuel vapor absorbed by the absorbent is transmitted to the intake passage 5 with air utilizing the intake negative pressure of the engine 1. After being supplied to the intake passage 5, the air containing the fuel vapor (purge gas) is burned in the engine 1.

An electronic control unit 19 mounted on the automobile to control the operation of the engine 1 executes a fuel injection amount control by the actuation of the fuel injection valve 4, a throttle opening degree control by the actuation of the throttle valve 10, an EGR control by the actuation of the EGR valve 11. The electronic control unit 19 functions as a controller. Furthermore, the electronic control unit 19 also executes a flow rate control of purge gas (purge control) by the actuation of the purge control valve 18, controls of the pressure control valve 16 and the atmospheric shutter valve 17. The electronic control unit 19 receives detection signals from various types of sensors described below.

A crank position sensor 20, which sends signals corresponding to rotation of a crankshaft 1a, which is an output shaft of the engine 1.

A gas pedal position sensor 22 for detecting the depression degree of a gas pedal 21, which is operated when a driver of the automobile depresses the gas pedal 21.

A throttle position sensor 23 for detecting the opening degree of the throttle valve 10.

A vacuum sensor 24 for detecting the pressure at a section of the intake passage 5 downstream the throttle valve 10.

An oxygen sensor 25, which sends signals corresponding to the concentration of oxygen in exhaust gas that passes through the exhaust passage 7.

A tank pressure sensor 26 for detecting the pressure in the fuel tank 2.

The fuel injection amount control of the engine 1 executed by the electronic control unit 19 will now be described.

The fuel injection amount control is achieved by controlling the fuel injection valve 4 such that fuel is injected by the amount corresponding to the final fuel injection amount Qfin computed by the following equation (1).

$$Qfin = Qbase \times (FAF \times KG(i) - PGR \times BG(k)) \qquad (1)$$

Qfin: Final fuel injection amount
Qbase: Basic fuel injection amount
FAF: Feedback compensation coefficient
KG(i): Air-fuel ratio learned value
PGR: Target purge rate
BG(k): Vapor concentration learned value The basic fuel injection amount Qbase, the feedback compensation coefficient FAF, the air-fuel ratio learned value KG(i), the target purge rate PGR, and the vapor concentration learned value BG(k), which are used in the equation (1), will be described below separately.

[Basic Fuel Injection Amount Qbase]

The basic fuel injection amount Qbase is a value representing the theoretical fuel injection amount to cause the air-fuel ratio of the air-fuel mixture in the combustion chamber 6 to seek the stoichiometric air-fuel ratio. The basic fuel injection amount Qbase is computed based on the engine speed and the engine load. The engine speed is obtained based on the detection signal from the crank position sensor 20. The engine load is computed based on the parameter corresponding to the intake air amount of the engine 1 and the engine speed. The parameter corresponding to the intake air amount of the engine 1 may be the intake pressure, the throttle opening degree, the gas pedal depression amount, or the like.

[Feedback Compensation Coefficient FAF]

The feedback compensation coefficient FAF is a value used for the feedback compensation (the air-fuel ratio feedback control) of the fuel injection amount to cause the air-fuel ratio of the engine 1 to seek the stoichiometric air-fuel ratio. The feedback compensation coefficient FAF is selectively increased and decreased around 1.0 in accordance with whether the detection signal from the oxygen sensor 25 corresponds to either a value richer than or a value leaner than a value corresponding to the stoichiometric air-fuel ratio. For example, if the detection signal from the oxygen sensor 25 corresponds to a value richer than a value corresponding to the stoichiometric air-fuel ratio, the feedback compensation coefficient FAF is decreased to decrease the fuel injection amount. If the detection signal from the oxygen sensor 25 corresponds to a value leaner than a value corresponding to the stoichiometric air-fuel ratio, the feedback compensation coefficient FAF is increased to increase the fuel injection amount. The correction of the fuel injection amount based on the feedback compensation coefficient FAF causes the air-fuel ratio of the air-fuel mixture in the engine 1 to seek the stoichiometric air-fuel ratio.

[Air-Fuel Ratio Learned Value KG(i)]

The air-fuel ratio learned value KG(i) is a value that is selectively increased and decreased to correct the fuel injection amount such that the average value FAFAV of the feedback compensation coefficient FAF converges within a predetermined range centered at 1.0 during the air-fuel ratio feedback control. The air fuel ratio learned value KG (i) is gradually increased when the average value FAFAV is greater than the predetermined range and is gradually decreased when the average value FAFAV is less than the predetermined range. As described above, the air-fuel ratio learned value KG(i) is selectively increased and decreased in accordance with the average value FAFAV such that the average value FAFAV converges within the predetermined range. The air-fuel ratio learned value KG(i) when the average value FAFAV has converged within the predetermined range is leaned (updated) as a value corresponding to the deviation between the air-fuel ratio in the engine 1 and the stoichiometric air-fuel ratio. The air-fuel ratio learned value KG(i) is set for every air-fuel ratio learned sections i (i=0, 1, 2, 3, 4 . . . ) divided in accordance with the engine load. That is, the air-fuel ratio learned value KG (i) is learned at every air-fuel ratio learned sections i.

[Target Purge Rate PGR]

The target purge rate PGR is a target value of the purge rate, which is a value representing the ratio of the purge gas amount to the intake air amount of the engine 1. The target purge rate PGR is computed based on the latest value of the feedback compensation coefficient FAF or the like. The target purge rate PGR is increased as, for example, the feedback compensation coefficient FAF is decreased. This is because, when the feedback compensation coefficient FAF is small, the air-fuel feedback is in a stable state and deterioration of combustion is not likely to occur even if a large amount of purge gas is supplied to the intake passage 5. Therefore, a large amount of fuel vapor absorbed in the canister 12 can be processed.

[Vapor Concentration Learned Value BG(k)]

The vapor concentration learned value BG(k) is learned (updated) as a value corresponding to the fuel vapor concentration of the purge gas based on the variation of the feedback compensation coefficient FAF caused by the introduction of the purge gas to the intake passage 5 when the air-fuel feedback control and the purge control are performed. The vapor concentration learned value BG (k) is learned (updated) using the following equation (2) at every predetermined cycle.

$$BG(k) = BG(k-1) + (FAF-1)/PGR \qquad (2)$$

BG(k): Latest vapor concentration learned value
BG(k−1): Previous vapor concentration learned value
FAF: Feedback compensation coefficient
PGR: Target purge rate The latest vapor concentration learned value BG(k) computed by the equation (2) is used for calculating the term "PGR×BG(k)" in the equation (1). The term is used for decreasing the amount of fuel injected from the fuel injection valve 4 by an amount corresponding to the fuel amount included in the purge gas supplied to the intake passage 5. Therefore, when the purge gas is supplied to the intake passage 5 by the purge control, the fuel injection amount of the engine 1 is corrected by the term "PGR×BG(k)" to suppress the fluctuation of the air-fuel ratio caused by the purge control.

The purge control executed by the electronic control unit 19 will now be described.

The purge control is executed when various requirements are satisfied. The requirements are, for example, that fuel cutoff of the engine 1 is not being performed, the air-fuel ratio feedback control is being performed, and the air-fuel ratio learned value KG(i) has been learned in the current air-fuel ratio learned section i. The adjustment of the flow rate of purge gas by the purge control is performed by selectively increasing and decreasing the drive duty ratio DPG used for the control of the purge control valve 18 to adjust the opening degree of the purge control valve 18. The purge control valve 18 is controlled such that the opening degree increases, that is, the flow rate of purge gas is increased as the drive duty ratio DPG is increased. The drive duty ratio DPG is computed based on the following equation (3).

$$DPG=(PGR/PGR\text{max})\times 100 \quad (3)$$

DPG: Drive duty ratio
PGR: Target purge rate
PGRmax: Maximum purge rate

The maximum purge rate PGRmax used in the equation (3) is the maximum permissible value of the purge rate computed based on the current intake air amount and the engine speed. The target purge rate PGR is a value computed based on, for example, the latest value of the feedback compensation coefficient FAF as described above. It is clear from the equation (3) that the drive duty ratio DPG is increased as the target purge rate PGR is increased. Therefore, as the set value of the target purge rate PGR is increased, the purge control valve 18 is controlled such that the opening degree is increased, which increases the flow rate of purge gas.

The canister 12 of the fuel vapor processing unit receives a large amount of gas containing fuel vapor. Therefore, to prevent the absorbent of the canister 12 from being saturated with fuel vapor, it is necessary to supply a large amount of purge gas to the intake passage 5 by the purge control and efficiently process the fuel vapor in the canister 12. Thus, the drive duty ratio DPG and the target purge rate PGR are computed to be maximized within a range that does not badly affect the fuel combustion in the engine 1.

The EGR control executed by the electronic control unit 19 will now be described.

The EGR control is achieved by adjusting the opening degree of the EGR valve 11 based on the engine speed and the engine load to obtain the EGR rate (rate of exhaust gas in the combustion chamber 6) required in accordance with the current operating condition. In other words, the EGR rate is the ratio of exhaust gas contained in the gas introduced to the combustion chamber 6. However, when the EGR gas is supplied to the intake passage 5 by the EGR control during the purge control, the intake pressure in the engine 1 approaches the atmospheric pressure. This badly affects the flow rate of purge gas. Therefore, when performing the EGR control during the purge control, the EGR rate is controlled taking into consideration of the target purge rate and the like such that the introduction of the EGR gas to the intake passage 5 does not become an external disturbance when controlling the flow rate of purge gas. The EGR rate controlled as described above is maximized within a range that does not excessively deteriorate the combustion of the engine 1 to achieve the maximum improvement of the emission.

The tank sealing system employed in the automobile of the preferred embodiment to restrict fuel vapor in the fuel tank 2 from being released to the atmosphere will now be described.

The tank sealing system hermetically closes the fuel tank 2 in the normal state and releases the fuel tank 2 only when necessary. The tank sealing system includes the pressure control valve 16, the atmospheric shutter valve 17, the purge control valve 18, and the electronic control unit 19, which controls the valves 16, 17, and 18. The electronic control unit 19 closes the pressure control valve 16 except when the fuel tank 2 needs to be released so that the fuel tank 2 is maintained hermetically closed. When executing the purge control while the fuel tank 2 is hermetically closed, the electronic control unit 19 opens the atmospheric shutter valve 17 so that the outside air is introduced to the canister 12. Furthermore, the electronic control unit 19 adjusts the opening degree of the purge control valve 18 to control the flow rate of purge gas supplied to the intake passage 5.

On the other hand, a state where the hermetically closed fuel tank 2 needs to be released includes a state where the pressure in the fuel tank 2 is increased such as when the automobile is being fueled.

When the automobile is being fueled, the electronic control unit 19 first releases the fuel tank 2 by opening the pressure control valve 16. A fill opening 2a of the fuel tank 2 is then opened such that the fuel tank 2 can be fueled. When fuel is supplied to the fuel tank 2 from the fill opening 2a, gas containing the fuel vapor in the fuel tank 2 flows to the canister 12 through the opened pressure control valve 16. The fuel vapor is then absorbed by the absorbent of the canister 12 so that the gas containing the fuel vapor is separated into the fuel vapor and the air.

When the pressure in the fuel tank 2 becomes greater than a predetermined value, the electronic control unit 19 executes the pressure release process for decreasing the pressure in the fuel tank 2 based on conditions that, for example, the purge control is being executed. That is, the electronic control unit 19 opens the pressure control valve 16 and releases the fuel tank 2. When the fuel tank 2 is released, the gas containing the fuel vapor in the tank 2 is released to the canister 12. Since the pressure release process is executed during the purge control, the gas released to the canister 12 immediately flows to the intake passage 5. This prevents the canister 12 from being saturated with fuel vapor.

Figure 2A:
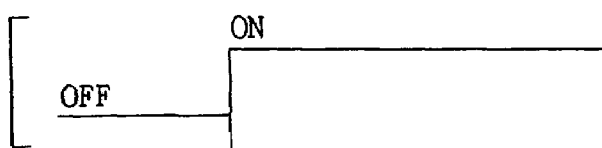
FIGS. 2(a) to 2(f) are time charts showing the performance of a purge control before and after a pressure release process is executed by the engine system shown in FIG. 1, changes in the pressure in the fuel tank, changes in the opening degree of the EGR valve, the opening and closing state of the pressure control valve, fluctuation of the air-fuel ratio in the engine, and the combustion condition of the engine.
Figure 2B:
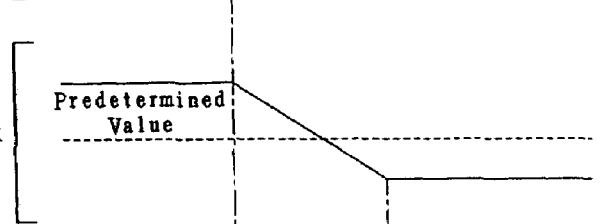

The operating condition of the engine 1 when the pressure release process is started will now be described with reference to the time chart of FIG. 2. FIG. 2(a) shows the performance of the purge control before and after the execution of the pressure release process. FIG. 2(b) shows changes in the pressure in the fuel tank 2, FIG. 2(c) shows changes in the opening degree of the EGR valve 11, FIG. 2(d) shows the opening and closing state of the pressure control valve 16, FIG. 2(e) shows fluctuation of the air-fuel ratio in the engine 1, and FIG. 2(f) shows one example of the combustion condition of the engine 1.

Figure 2C:
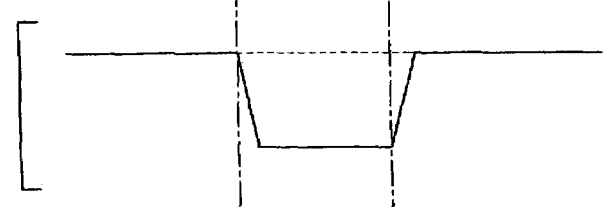
Figure 2D:
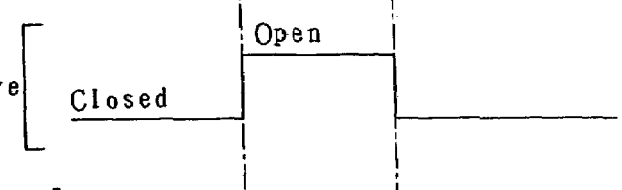

FIG. 2(c) shows the opening degree of the EGR valve 11, which is adjusted by the EGR control. Assume that the EGR gas is introduced to the intake passage 5 by the EGR control. In this case, when the pressure in the fuel tank 2 becomes higher than the predetermined value and the purge control is started (a time T1), the pressure release process is executed. The pressure control valve 16 that has been closed is opened by the pressure release control, thereby releasing the fuel tank 2. As a result, the gas in the fuel tank 2 is released to the intake passage 5 through the vapor passage 13, the canister 12, and the purge passage 15. Accordingly, the pressure in the fuel tank 2 is decreased below the predetermined value.

Figure 2E:
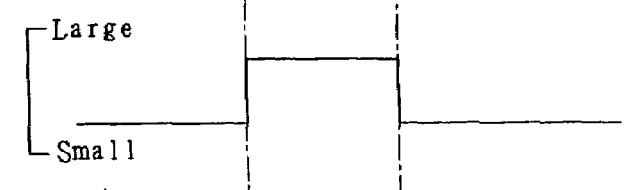
Figure 2F:

Since the gas in the fuel tank 2 is released to the intake passage 5, increase in the fluctuation of the air-fuel ratio of the engine 1 as shown in FIG. 2(e) is inevitable. The reason for this is that the fuel vapor concentration of the gas in the fuel tank 2 is unclear and the fluctuation of the air-fuel ratio in the engine 1, which is caused when the gas in the fuel tank 2 is abruptly supplied to the intake passage 5 as the fuel tank 2 is released, cannot be suppressed sufficiently by the air-fuel ratio feedback control and by correcting the fuel injection amount using the term "PGR×BG(k)" of the equation (1). Therefore, when the fluctuation of the air-fuel ratio is increased, combustion is more likely to become unstable as the EGR gas is introduced to the intake passage 5 by the EGR control. As described above, the EGR control adjusts the opening degree of the EGR valve 11 such that the EGR rate is maximized within a range that does not excessively deteriorate combustion of the engine 1. Therefore, when fluctuation of the air-fuel ratio is increased according to the execution of the pressure release process, combustion becomes unstable as shown in FIG. 2(*f*). The deterioration of the driving performance caused due to the unstable combustion becomes unignorable.

To avoid such problems, besides releasing the fuel tank 2 in the pressure release process, the electronic control unit 19 of the preferred embodiment decreases the EGR rate. More specifically, as shown by a solid line in FIG. 2(*c*), the opening degree of the EGR valve 11 is decreased as the pressure release process is started (the time T1). This restricts introduction of the EGR gas to the intake passage 5. Therefore, combustion is prevented from being unstable due to the fluctuation of the air-fuel ratio.

Figure 3:
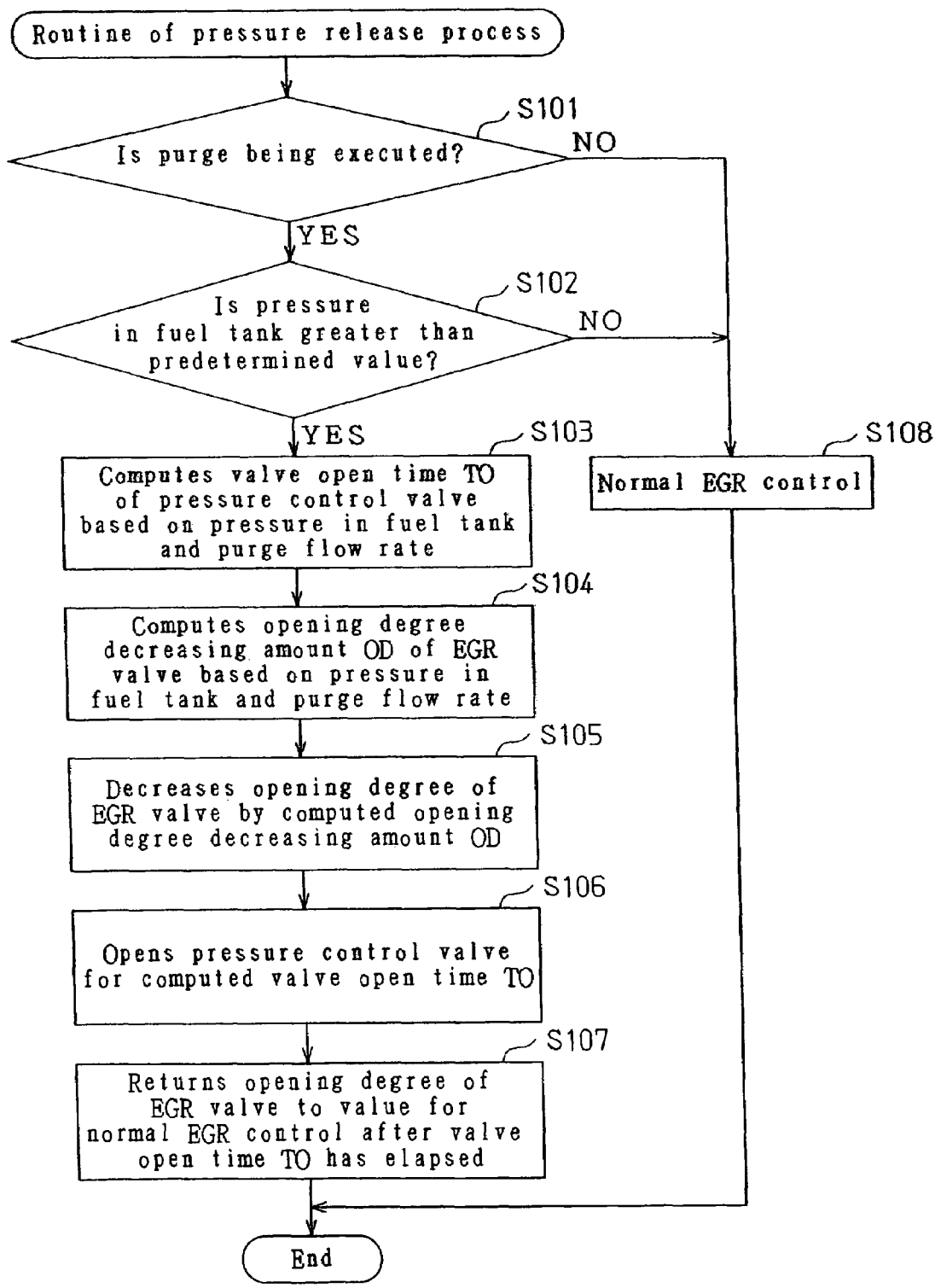
FIG. 3 is a flowchart showing a procedure for the pressure release process executed by the engine system shown FIG. 1.

The procedure for the pressure release process of the preferred embodiment will now be described with reference to the flowchart of FIG. 3 showing the pressure release routine. The procedure includes releasing the fuel tank 2 and decreasing the EGR rate. The pressure release control routine is executed as an interrupt by the electronic control unit 19 at, for example, predetermined time intervals.

Steps S101, S102 of this routine are performed to determine whether requirements for executing the pressure release process are satisfied. That is, at step S101, the electronic control unit 19 determines whether the purge control is being executed. At step S102, the electronic control unit 19 determines whether the pressure in the fuel tank 2 is greater than a predetermined value. If the decision outcomes of steps S101, S102 are positive, the electronic control unit 19 determines that the requirements for executing the pressure release process are satisfied. The electronic control unit 19 then executes step S103 and the subsequent steps for releasing the fuel tank 2 and reducing the EGR rate. On the other hand, if the decision outcome of either step S101 or S102 is negative, the electronic control unit 19 determines that the requirements for executing the pressure release process are not satisfied. In this case, the pressure release process is not executed and the EGR control is executed as in the normal state at step S108.

In step S103 and the following steps, calculation of the valve open time TO, which is the time during which the pressure control valve 16 is opened to release the fuel tank 2 (step S103), and calculation of the opening degree decreasing amount OD, which is the amount by which the opening degree of the EGR valve 11 is decreased from the current opening degree to decrease the EGR rate (step S104), are successively performed. Subsequently, the opening degree of the EGR valve 11 is decreased by the computed opening degree decreasing amount OD at step S105, and further, the pressure control valve 16 is opened for the computed valve open time TO at step S106. After the valve open time TO has elapsed, the pressure control valve 16 is closed again, and the opening degree of the EGR valve 11 is returned to a value for the case where the normal EGR control is performed at step S107. That is, the opening degree of the EGR valve 11 is selectively increased and restored.

The computation of the valve open time TO at step S103 and the computation of the opening degree decreasing amount OD at step S104 are separately described below.

[Valve Open Time TO]

The computation of the valve open time TO at step S103 is performed based on the pressure in the fuel tank 2 before releasing gas and the purge flow rate before releasing gas. The valve open time TO computed as described above is shortened as the pressure in the fuel tank 2 is increased and shortened as the purge flow rate is increased. The reason for this is as follows.

Figure 4:
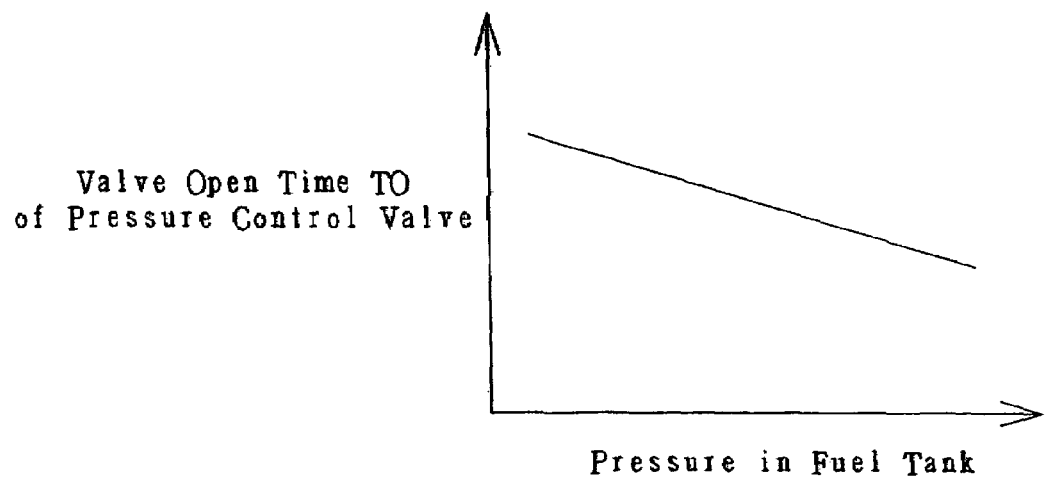
FIG. 4 is a graph showing the relationship between the pressure in the fuel tank before executing the pressure release process shown in FIG. 3 and the valve open time TO of the pressure control valve during the pressure release process.

The higher the pressure in the fuel tank 2 when the pressure control valve 16 is opened is, the faster the flow rate of gas released to the canister 12 from the fuel tank 2 becomes. Accordingly, the amount of gas released to the canister 12 from the fuel tank 2 per unit time is increased. As the released gas amount is increased, the fluctuation of the air-fuel ratio in the engine 1 is increased. To suppress the large fluctuation of the air-fuel ratio, the valve open time TO is computed to be shorter as the pressure in the fuel tank 2 before releasing gas becomes higher as shown in FIG. 4.

Figure 5:
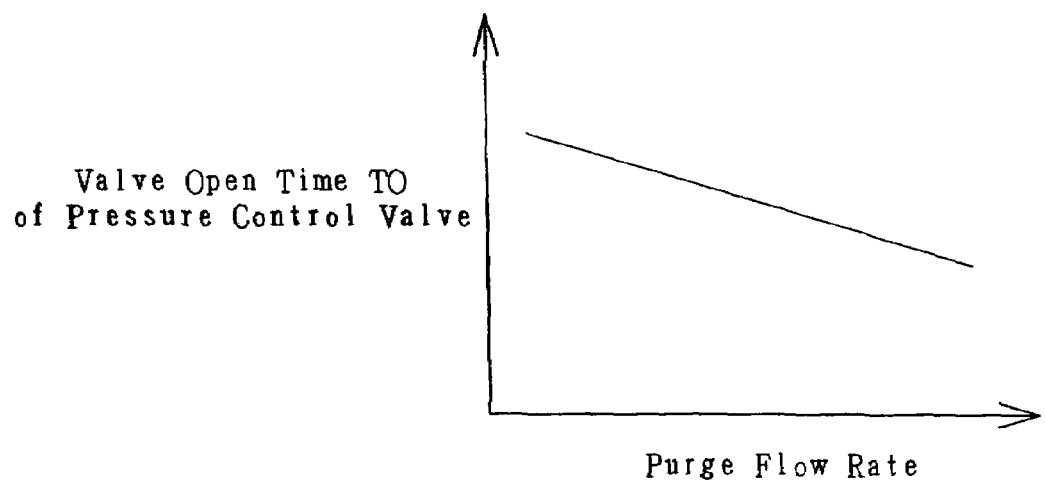
FIG. 5 is a graph showing the relationship between the purge flow rate before executing the pressure release process shown in FIG. 3 and the valve open time TO of the pressure control valve during the pressure release process.

The greater the amount of fuel vapor supplied to the intake passage 5 from the canister 12 before the gas in the fuel tank 2 is released is, that is, the greater the opening degree of the purge control valve 18 is, the easier it becomes for the gas in the fuel tank 2 to flow to the intake passage 5 when the gas is released by opening the pressure control valve 16. That is, the amount of gas that is released from the fuel tank 2 and supplied to the intake passage 5 when the pressure control valve 16 is opened is increased. As the amount of gas supplied to the intake passage 5 is increased, the fluctuation of the air-fuel ratio in the engine 1 is increased. To suppress the large fluctuation of the air-fuel ratio, the valve open time TO is computed to be shorter as the purge flow rate (purge rate×intake air amount) before releasing gas is increased as shown in FIG. 5. The purge flow rate is a parameter related to the amount of fuel vapor supplied to the intake passage 5 from the canister 12. The amount of fuel vapor tends to increase as the purge flow rate is increased.

The electronic control unit 19 computes the valve open time TO as described above. Therefore, the amount of gas released from the fuel tank 2 while the pressure control valve 16 is opened during the pressure release process is prevented from being increased to an amount that badly affects the fluctuation of the air-fuel ratio. At the same time, the amount of gas released from the fuel tank 2 can be increased to the maximum.

[Opening Degree Decreasing Amount OD]

The computation of the opening degree decreasing amount OD at step S104 is also performed based on the pressure in the fuel tank 2 before releasing gas and the purge flow rate before releasing gas. The opening degree decreasing amount OD computed as described above is increased as the pressure in the fuel tank 2 is increased and is increased as the purge rate is increased. The reason for this is as follows.

Figure 6:
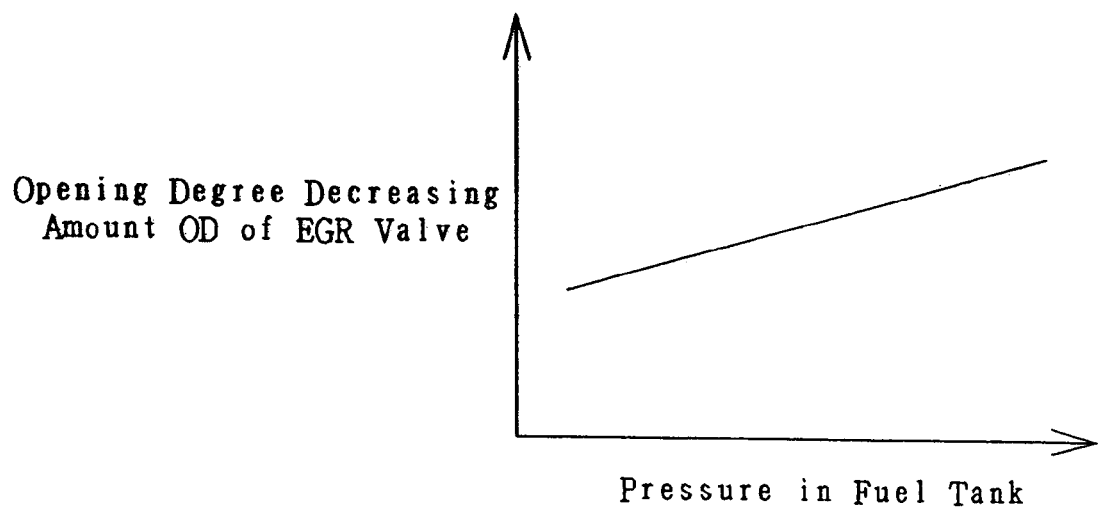
FIG. 6 is a graph showing the relationship between the pressure in the fuel tank before executing the pressure release process shown in FIG. 3 and the opening degree decreasing amount OD of the EGR valve during the pressure release process.

The higher the pressure in the fuel tank 2 when the pressure control valve 16 is opened is, the greater the amount of gas released to the canister 12 from the fuel tank 2 per unit time becomes. As the amount of gas is increased, the fluctuation of the air-fuel ratio in the engine 1 is increased. That is, the tendency that the combustion becomes unstable as the EGR gas is introduced to the intake passage 5 becomes significant by the large fluctuation of the air-fuel ratio. To suppress the combustion from being unstable, the opening degree decreasing amount OD is computed to be greater as the pressure in the fuel tank 2 before releasing gas becomes higher as shown in FIG. 6.

Figure 7:
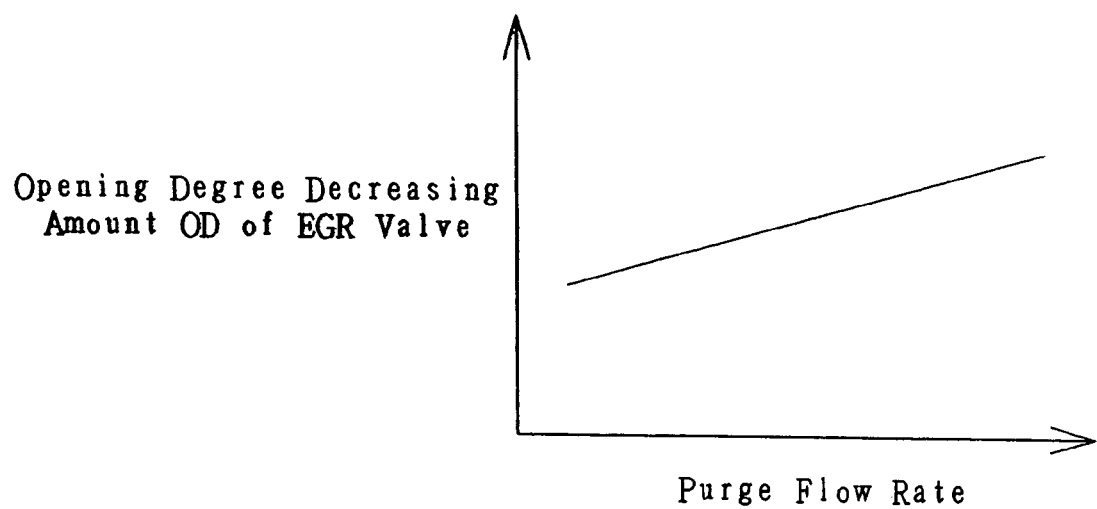
FIG. 7 is a graph showing the relationship between the purge flow rate before executing the pressure release process shown in FIG. 3 and the opening degree decreasing amount OD of the EGR valve during the pressure release process.

The greater the fuel vapor supplied to the intake passage 5 from the canister 12 is when the pressure control valve 16 is closed, the greater the amount of gas released from the fuel tank 2 and supplied to the intake passage 5 becomes when the pressure control valve 16 is opened. As the amount of gas is increased, the fluctuation of the air-fuel ratio in the engine 1 is increased. That is, the tendency that the combustion becomes unstable as the EGR gas is introduced to the intake passage 5 becomes significant by the increase of the fuel vapor supplied to the intake passage 5. To suppress the combustion from being unstable, the opening degree decreasing amount OD is computed to be smaller as the purge flow rate (purge flow rate=purge rate×intake air amount) before releasing gas is increased as shown in FIG. 7. As described above, the purge flow rate is a parameter corresponding to the amount of fuel vapor supplied to the intake passage 5 from the canister 12.

The electronic control unit 19 computes the opening degree decreasing amount OD as described above. Therefore, the unstable state of the combustion in the combustion chamber 6 caused by the introduction of the EGR gas to the intake passage 5 is prevented from being significant due to the fluctuation of the air-fuel ratio. At the same time, the EGR rate can be increased to the maximum.

This embodiment provides the following advantages.

(1) Besides releasing the fuel tank 2 by opening the pressure control valve 16 as the pressure release process for decreasing the pressure in the fuel tank 2, the EGR rate is decreased. Therefore, even if the gas in the fuel tank 2 flows into the intake passage 5 as the pressure control valve 16 is opened and causes the air-fuel ratio to fluctuate, the unstable state of the combustion in the combustion chamber 6 caused by the introduction of the EGR gas to the intake passage 5 is prevented from being significant.

(2) The valve open time TO of the pressure control valve 16 used for releasing the fuel tank 2 in the pressure release process is shortened as the pressure in the fuel tank 2 before releasing gas is increased. The valve open time To of the pressure control valve 16 is shortened as the purge flow rate before releasing gas in the fuel tank 2 is increased. Therefore, the amount of gas released from the fuel tank 2 while the pressure control valve 16 is opened during the pressure release process is prevented from being increased to an amount that badly affects the fluctuation of the air-fuel ratio. At the same time, the amount of gas can be increased to the maximum.

(3) The opening degree decreasing amount OD of the EGR valve 11 used for decreasing the EGR rate in the pressure release process is increased as the pressure in the fuel tank 2 before releasing gas is increased and is increased as the purge flow rate before releasing gas is increased. In other words, the higher the pressure in the fuel tank 2 is before releasing gas from the fuel tank 2, the more the electronic control unit 19 decreases the EGR rate, and the greater the purge flow rate is before releasing gas, the more the electronic control unit 19 decreases the EGR rate. Therefore, the unstable state of the combustion in the combustion chamber 6 caused by the introduction of the EGR gas to the intake passage 5 is prevented from being significant due to the fluctuation of the air-fuel ratio. At the same time, the EGR rate can be increased to the maximum.

The invention may be embodied in the following forms.

When decreasing the EGR rate through the pressure release process, the opening degree of the EGR valve 11 may be set to zero instead of decreasing the opening degree of the EGR valve 11 by the opening degree decreasing amount OD. That is, the EGR rate may be decreased to zero.

In this case, even if the air-fuel ratio fluctuates as the gas in the fuel tank 2 is released, the combustion is reliably prevented from being unstable due to the introduction of the EGR gas to the intake passage 5.

The valve open time TO of the pressure control valve 16 in the pressure release process may be computed based on only one of the pressure in the fuel tank 2 and the purge flow rate.

The opening degree decreasing amount OD of the EGR valve 11 in the pressure release process may be computed based on only one of the pressure in the fuel tank 2 and the purge flow rate.

The present invention may be applied to a diesel engine. In this case, the EGR control is achieved by the adjustment of the opening degree of the EGR valve and the adjustment of the opening degree of an intake throttle valve. The EGR rate is decreased in the pressure release process by the adjustment of the opening degree of the EGR valve and the adjustment of the opening degree of the intake throttle valve.

The present examples and embodiments are to be considered as illustrative and not restrictive and the invention is not to be limited to the details given herein, but may be modified within the scope and equivalence of the appended claims.

The invention claimed is:

1. An internal combustion engine system, the engine system comprising:
   an internal combustion engine, which has a combustion chamber and an intake passage connected to the combustion chamber;
   a fuel tank for storing fuel;
   a canister for storing fuel vapor generated in the fuel tank, when the engine is running, fuel vapor is permitted to flow to the intake passage from the canister, and when fuel vapor flows to the intake passage, the amount of fuel injected to the engine is corrected to suppress fluctuation of the air-fuel ratio in the engine due to the fuel vapor;
   an EGR mechanism for introducing part of exhaust gas exhausted from the engine to the intake passage, the EGR mechanism variably sets the EGR rate, which is the ratio of exhaust gas contained in gas introduced to the combustion chamber;
   a tank sealing system for sealing the fuel tank, when the pressure in the fuel tank is greater than or equal to a predetermined value, the sealing system releases gas containing fuel vapor from the fuel tank to the canister on condition that fuel vapor is flowing to the intake passage from the canister; and
   a controller for controlling the EGR mechanism to reduce the EGR rate when gas is released from the fuel tank to the canister.

2. The engine system according to claim 1,
   wherein the tank sealing system includes a passage, which connects the fuel tank to the canister, and a pressure control valve located in the passage, when the pressure control valve is opened, gas is released from the fuel tank to the canister, and
   wherein the controller shortens the valve open time of the pressure control valve as the pressure in the fuel tank before releasing gas is increased.

3. The engine system according to claim 1,
   wherein the tank sealing system includes a passage, which connects the fuel tank to the canister, and a pressure control valve located in the passage, when the pressure control valve is opened, gas is released from the fuel tank to the canister, and wherein the controller shortens the valve open time of the pressure control valve as fuel vapor flowing to the intake passage from the canister before releasing gas from the fuel tank becomes greater.

4. The engine system according to claim 1, wherein the higher the pressure in the fuel tank is before releasing gas from the fuel tank, the more the controller decreases the EGR rate.

5. The engine system according to claim 1, wherein the greater the amount of fuel vapor flowing to the intake passage from the canister is before releasing gas from the fuel tank, the more the controller decreases the EGR rate.

6. The engine system according to claim 1, wherein, when gas is released from the fuel tank to the canister, the controller controls the EGR mechanism such that the EGR rate becomes zero.

7. A vehicle comprising the engine system according to claim 1.

8. A method for controlling an internal combustion engine system equipped with an internal combustion engine and an EGR mechanism, which EGR mechanism introduces part of exhaust gas exhausted from the engine to an intake passage, the method comprising:

storing fuel vapor generated in a fuel tank in a canister;

permitting fuel vapor to flow to the intake passage from the canister when the engine is running;

correcting the amount of fuel injected to the engine to suppress fluctuation of the air-fuel ratio in the engine due to fuel vapor when fuel vapor flows to the intake passage;

sealing the fuel tank when the pressure in the fuel tank is less than a predetermined value, and when the pressure in the fuel tank is greater than or equal to the predetermined value, releasing gas containing fuel vapor from the fuel tank to the canister on condition that fuel vapor is flowing to the intake passage from the canister; and controlling the EGR mechanism to decrease the EGR rate, which is the ratio of exhaust gas contained in gas introduced to the combustion chamber, when gas is released from the fuel tank to the canister.

* * * * *